Jan. 11, 1927. 1,614,134
H. KREIDEL
LUBRICATING GUN
Filed August 25, 1926
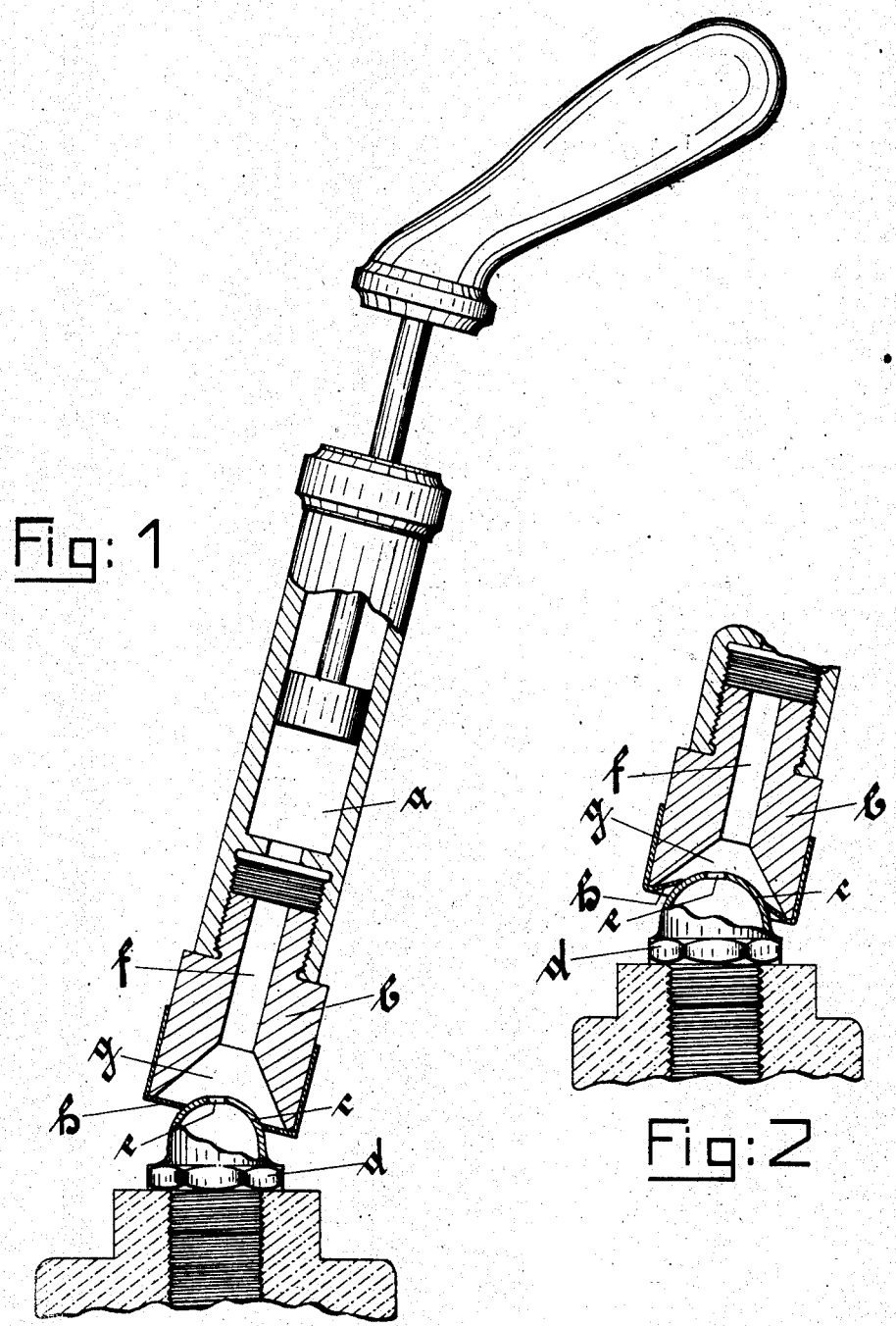
Fig: 1
Fig: 2
Inventor:
Hans Kreidel
by Lowe, Kehlenbeck & Farley
Attorneys Patented Jan. 11, 1927.

1,614,134

UNITED STATES PATENT OFFICE.

HANS KREIDEL, OF WIESBADEN, GERMANY.

LUBRICATING GUN.

Application filed August 25, 1926, Serial No. 131,326, and in Germany May 13, 1925.

This invention relates to lubricating guns of the type wherein the connection between the gun and the nipple to be lubricated is formed by merely pressing the nozzle of the gun into contact with the nipple, while operating the gun to force the lubricant into the nipple.

An object of the invention is to provide a nozzle which will effectively engage the nipple even when the axis of the gun is not alined with the axis of the nipple.

In guns of this type it is known to use washers or gaskets of pliable material, such as leather, to prevent the lubricant from extruding between the nozzle and the nipple. The disadvantage of such a structure lies in the fact that the gasket quickly becomes worn and allows leakage of the lubricant. This is particularly true where the lubricant is forced into the bearing under high pressure.

The present invention aims to overcome the foregoing and other disadvantages by providing means whereby the nozzle may engage the nipple in liquid-tight relation, and also by eliminating the necessity for frequent renewal of parts.

In order to obtain an efficient joint in any angular position of the grease gun in relation to the head of the lubricating nipple between the nipple and the nozzle of the grease gun the latter is provided with an enlarged outlet passage and a thin metal diaphragm extending over this and having an aperture at the middle. The head of the lubricating nipple which passes into the aperture of the diaphragm is preferably of conical or semi-spherical shape. Its diameter is larger than that of the aperture in the diaphragm so that the flexible metal diaphragm cannot be passed completely over the lubricating nipple, but can bear thereon in all angular positions of the nozzle of the grease gun and form an edge contact.

In the accompanying drawing are illustrated two examples of construction in accordance with the invention in longitudinal section.

Figure 1 shows a complete grease gun the nozzle of which is provided with a frusto-conical enlarged outlet opening over which extends a flat diaphragm, applied to a lubricating nipple, and Figure 2 shows the nozzle of a grease gun having a frusto-conical diaphragm also bearing upon the head of a lubricating nipple.

$a$ is the grease gun itself, $b$ the nozzle thereof formed of any suitable material for this purpose, and $c$ the semi-spherical or domed head of a lubricating nipple $d$ against which the nozzle of the grease gun is forced or pressed as tightly as possible when using the grease gun. In the top of the head of the lubricating nipple is provided a passage $e$ for the lubricant, for example grease or the like. The passage $f$ for the lubricant in the nozzle $b$ leads to a frusto-conical enlargement $g$ over which extends a diaphragm $h$ of thin metal for example sheet steel or the like and which is secured to the nozzle in any suitable manner. The diaphragm $h$, as shown in Figure 1, may lie flatly over the outlet opening of the nozzle, or, as shown in Figure 2 may be of frusto-conical shape and drawn into the enlargement of the nozzle. It is provided with an opening of which the diameter is smaller than that of the head of the lubricating nipple so that this can only pass partly through the opening in the diaphragm. When the nozzle of the gun is pressed against the head of the lubricating nipple it yields somewhat and the metal of the diaphragm bears on the nipple so as to form a resilient dirt-cutting edge, that is, an edge which will cut through any dirt or grease which may be adhering to the surface of the nipple. It also enables the grease gun to be held in an angular position in relation to the nipple. The opening $e$ in the lubricating nipple and the outlet opening in the nozzle of the grease gun need therefore not be arranged axially in relation to one another. The contact between the nozzle of the grease gun and the head of the lubricating nipple is thus a purely metal one and it remains always effective as the edge of the aperture conforms in all positions to the head of the lubricating nipple.

Having thus described my invention, what I claim as new and desire to secure by Letters Patent is:—

1. In a device of the class described, a nozzle having a recess at its end and having a passage for conducting lubricant to said recess, and a resilient metallic diaphragm extending over said recess, said diaphragm being provided with an aperture adapted to receive a lubricating nipple.

2. In a lubricating gun, a metallic nozzle having a recess at its end, and having an inturned portion presenting a resilient dirt-cutting edge adjacent said recess and adapted to engage the outer surface of a lubricating nipple.

3. In a device of the class described, a nozzle having a recess at its end, and having a passage for conducting lubricant to said recess, a resilient metallic frusto-conical member extending over said recess, said member being provided with an aperture, the metal of said member adjacent said aperture forming a cutting edge adapted to engage a lubricating nipple.

4. In a device of the class described, a nozzle having a bore terminating in a recess, and a resilient metallic frusto-conical diaphragm secured to said nozzle and extending over said recess, said diaphragm being provided with a circular aperture, the metal of said diaphragm adjacent said aperture forming an edge adapted to engage the head of a lubricating nipple.

In testimony whereof I affixed my signature.

HANS KREIDEL.